UNITED STATES PATENT OFFICE.

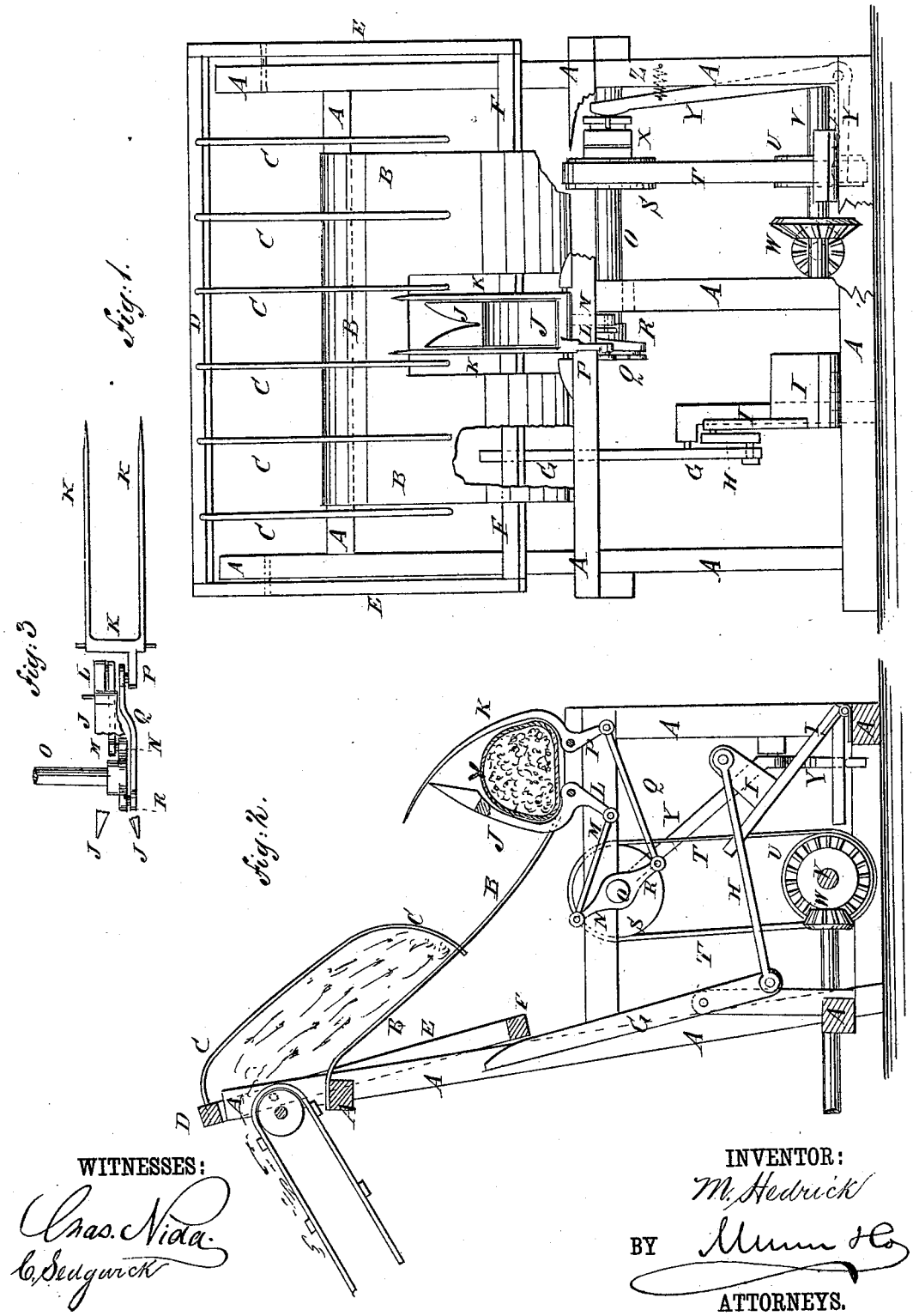

MASON HEDRICK, OF OAKLAND CITY, INDIANA.

AID-BINDER ATTACHMENT FOR HARVESTERS.

SPECIFICATION forming part of Letters Patent No. 250,915, dated December 13, 1881.

Application filed October 1, 1880. (No model.)

*To all whom it may concern:*

Be it known that I, MASON HEDRICK, of Oakland City, in the county of Gibson and State of Indiana, have invented a new and useful Improvement in Aid-Binder Attachments for Harvesters, of which the following is a specification.

Figure 1 is a front view of the improvement. Fig. 2 is a sectional side elevation. Fig. 3 is a plan view of the pressing-arms opened, and part being broken away.

The object of this invention is to furnish attachments for harvesters by the aid of which one man can bind grain as fast as a harvester can cut it.

The invention consists in adapting the driving mechanism of a harvester to compress the gavel by the means hereinafter described, and pointed out in the claim.

Similar letters of reference indicate corresponding parts.

A represents a frame attached to or formed upon the frame-work of the harvester. The rear part of the frame A projects upward, so as to receive the cut grain from the elevator of the harvester upon an inclined apron, B, made of sheet metal or other suitable material, and extending from the top of the projecting rear part of the frame A to the front of the horizontal part of the said frame, as shown in Figs. 1 and 2. The cut grain is stopped upon the apron B by curved fingers C, the lower ends of which rest upon the forward side of the said apron. The upper ends of the curved fingers C are attached to the bar D, the ends of which are attached to the upper ends of two bars or arms, E. The lower ends of the bars E are connected by a cross-bar, F.

The frame D E E F is hinged at its upper part to the upper ends of the posts of the upwardly-projecting rear part of the frame A, so that the fingers C will be raised from the apron B to drop a gavel of cut grain by swinging the lower part of the frame D E E F forward. G is a lever, which is pivoted to a support attached to the lower part of the frame A in such a position that the upper end of the said lever G will rest against the rear side of the cross-bar F.

To the lower end of the lever G is pivoted the rear end of a connecting-bar, H, the forward end of which is pivoted to the end of the upper arm of a bent lever, I. The bent lever I is hinged to the lower part of the frame A in such a position that the operator can conveniently reach and operate it with his foot to raise the fingers C and drop a gavel. As the gavel is released from the fingers C it slides down the apron B into the space between the pressing-arms J K, which are hinged at a little distance from each other to a support attached to the frame A. The arms J K are curved, and the upper end of the arm J has a V-shaped notch formed in it to receive and hold the end of a straw band. The arm K is forked, the space between its prongs being large enough to receive the arm J when the two arms are drawn together to compress the gavel.

To the base of the arm J is attached, or upon it is formed, a rigid arm, L, to the lower end of which is pivoted the end of a connecting-rod, M. The other end of the connecting-rod M is pivoted to the end of an arm, N, rigidly attached to the shaft O. To the base of the forked arm K is attached, or upon it is formed, a rigid arm, P, to the lower end of which is pivoted the end of a connecting rod, Q. The other end of the connecting-rod Q is pivoted to the end of an arm, R, rigidly attached to the shaft O, and projecting in the opposite direction from the arm N.

If desired, the two arms N R may be made in the form of a cross-bar attached at its center to the shaft O. The shaft O revolves in bearings attached to the upper horizontal part of the frame A, and upon its outer part is placed a loose pulley, S, around which passes a belt, T. The belt T also passes around a pulley, U, attached to a shaft, V, which revolves in bearings attached to the lower part of the frame A, and which is connected with the driving mechanism of the harvester by beveled-gear wheels W, so as to be driven by the advance of the harvester.

Upon the outer part of the shaft O is placed a friction-clutch, X, which, when moved inward, engages with the loose pulley S, so that the shaft O will be revolved by and with the said pulley. With the clutch X is connected the upper end of a bent lever, Y, which is pivoted at its angle to the frame A. The other arm of the bent lever Y projects into such a position that it can be reached and operated by the operator with his foot, or is connected with a treadle that can be operated by the operator with his foot. The clutch X is drawn back, when the lever Y is released from the operator's foot, by a spring, Z, coiled around the shaft O, or connected with the clutch-lever Y, as may be desired. In using the aid-binder, when enough grain for a gavel has been collected by the fingers C the operator lays a band in the notch of the arm J and the fork of the arm K and presses upon the lever I with his foot, which moves the lower part of the frame D E F forward and raises the fingers C, allowing the gavel to slide down the apron B into the space between the arms J K. As the gavel escapes from the fingers C the operator withdraws his foot from the lever I, which allows the fingers C to drop down upon the apron B and again stop the grain. As the fingers C drop down against the apron B to again stop the grain the operator presses upon the lever Y, which throws the clutch X into gear with the pulley O, causing the arms J K to close upon and compress the gavel, and bringing the ends of the band together, so that the operator has only to twist the band and tuck it loosely, the band being drawn tight by the expansion of the bundle as soon as the arms J K are withdrawn. As the operator tucks the band he releases the lever Y, and the arms J K at once open, allowing the bundle to be removed and dropped from the harvester.

With the assistance of this improvement one man can readily bind the grain as fast as the harvester can cut it.

Having thus fully described my invention, I claim as new and desire to secure by Letters Patent—

In a harvester, the combination, with the arms J K, of the arms L P, the connecting-rods M Q, the arms N R, the shaft O, the pulley S, the clutch X, the band T, the pulley U, the shaft V, and the gear-wheels W, whereby the arms J K can be drawn together to compress a gavel by the driving mechanism, as described.

MASON HEDRICK.

Witnesses:
CHARLES MEAD,
FLEMING VICKERS.